United States Patent
Konno et al.

(10) Patent No.: US 7,380,872 B2
(45) Date of Patent: Jun. 3, 2008

(54) WHEELED VEHICLE WITH COVERS

(75) Inventors: Toshihiko Konno, Shizuoka (JP);
Yoshiharu Matsumoto, Shizuoka (JP);
Kouji Ooishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 344 days.

(21) Appl. No.: 11/126,696

(22) Filed: May 11, 2005

(65) Prior Publication Data

US 2005/0279556 A1    Dec. 22, 2005

(30) Foreign Application Priority Data

Jun. 18, 2004  (JP)  ............................. 2004-181463
Jul. 22, 2004  (JP)  ............................. 2004-214807

(51) Int. Cl.
*B62J 23/00* (2006.01)
(52) U.S. Cl. .................................................. 296/181.2
(58) Field of Classification Search ............. 296/181.1, 296/181.2, 181.5, 193.03, 198; 180/219
See application file for complete search history.

(56) References Cited

FOREIGN PATENT DOCUMENTS

| JP | 04-331686 | | 11/1992 |
|----|-----------|---|---------|
| JP | 07232678 A | * | 9/1995 |
| JP | 10-67365 | | 3/1998 |
| JP | 3406159 | | 3/2003 |

* cited by examiner

*Primary Examiner*—Kevin Hurley
(74) *Attorney, Agent, or Firm*—Keating & Bennett, LLP

(57) ABSTRACT

A wheeled vehicle includes wheels. A frame supports the wheels. First and second covers cover the wheels or the frame. The first cover includes first, second and third openings. The openings are preferably slots. The respective openings are arranged to form a triangle. The second cover includes first, second and third projections corresponding to the first, second and third openings of the first cover, respectively. The first, second and third projections are inserted into the associated first, second and third openings to couple the second cover with the first cover.

17 Claims, 15 Drawing Sheets

WHEELED VEHICLE WITH COVERS

PRIORITY INFORMATION

The present application is based on and claims priority under 35 U.S.C. § 119 to Japanese Patent Applications No. 2004-181463, filed on Jun. 18, 2004, and No. 2004-214807, filed on Jul. 22, 2004, the entire contents of which are expressly incorporated by reference herein.

BACKGROUND OF THE INVENTION

1. Field of the Invention

The present invention relates to a wheeled vehicle with covers, and more particularly to a wheeled vehicle having covers that cover a frame of the vehicle.

2. Description of Related Art

Wheeled vehicles such as, for example, motorcycles, scooters and mopeds typically include a frame that supports wheels, an engine, a seat and other components. Typically, the scooters and mopeds include multiple covers that cover the frame. Some of the covers are directly attached to the frame, while other covers are coupled together and are indirectly attached to the frame through the covers that are directly attached to the frame. For example, Japanese Patent No. 3406159 and Japanese Patent Publications No. 04-331686 and No. 10-67365 disclose coupling strutures of such cover to a frame or to another cover.

In the coupling structure disclosed in Japanese Patent Publication No. 10-67365, a cover is coupled to another cover. The former cover includes engaging pieces, while the latter cover includes slots into which the respective engaging pieces are inserted. Because the engaging pieces are relatively small and fragile, if the former cover receives a force that rotates the engaging pieces about an axis of each engaging piece, the engaging pieces can be easily broken.

SUMMARY OF THE INVENTION

To overcome the problems described above, preferred embodiments of the present invention provide a wheeled vehicle including a multiple cover coupling structure that can endure the above-described forces without breaking.

A preferred embodiment of the present invention provides a wheeled vehicle including wheels. A frame is arranged to support the wheels. First and second covers are arranged to cover the wheels or the frame. The first cover includes first, second and third openings. The respective openings are arranged to form a triangle. The second cover includes first, second and third projections corresponding to the first, second and third openings of the first cover, respectively. The first, second and third projections are inserted into the associated first, second and third openings to couple the second cover with the first cover.

In accordance with another preferred embodiment of the present invention, a wheeled vehicle includes wheels. A frame is arranged to support the wheels. First and second covers are arranged to cover the wheels or the frame. The first cover includes first, second and third slots. The first and second slots are arranged along a substantially straight line. The third slot is arranged so as to be spaced from the substantially straight line. The second cover includes first, second and third projections corresponding to the first, second and third slots of the first cover, respectively. The first, second and third projections are inserted into the associated first, second and third slots to couple the first cover and the second cover with each other.

In accordance with a further preferred embodiment of the present invention, a method is provided for coupling first and second covers of a wheeled vehicle with each other, including the steps of forming first, second and third slots on the first cover such that the first, second and third slots define a triangle, forming first, second and third projections on the second cover to correspond to the first, second and third slots, respectively, each of the slots having a longitudinal axis, each of the slots having first and second ends that are spaced apart from each other on the longitudinal axis, the second end of each slot being narrower than the first end thereof, inserting each of the first, second and third projections into the second end of the associated slot, and moving the second cover such that each of the first, second and third projections moves toward the first end.

These and other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
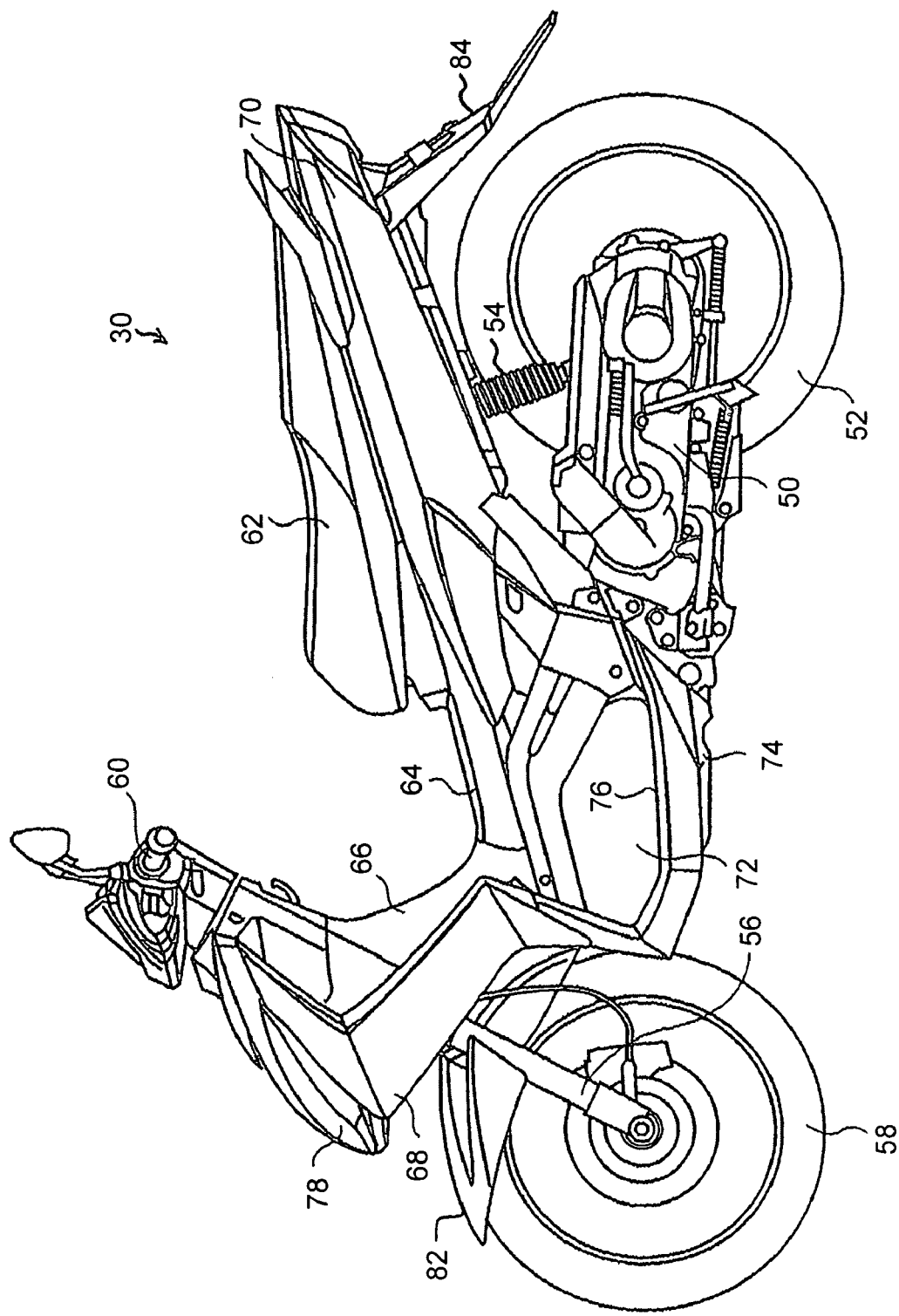
FIG. 1 illustrates a side elevation view of a moped configured in accordance with a preferred embodiment of the present invention.
Figure 2:
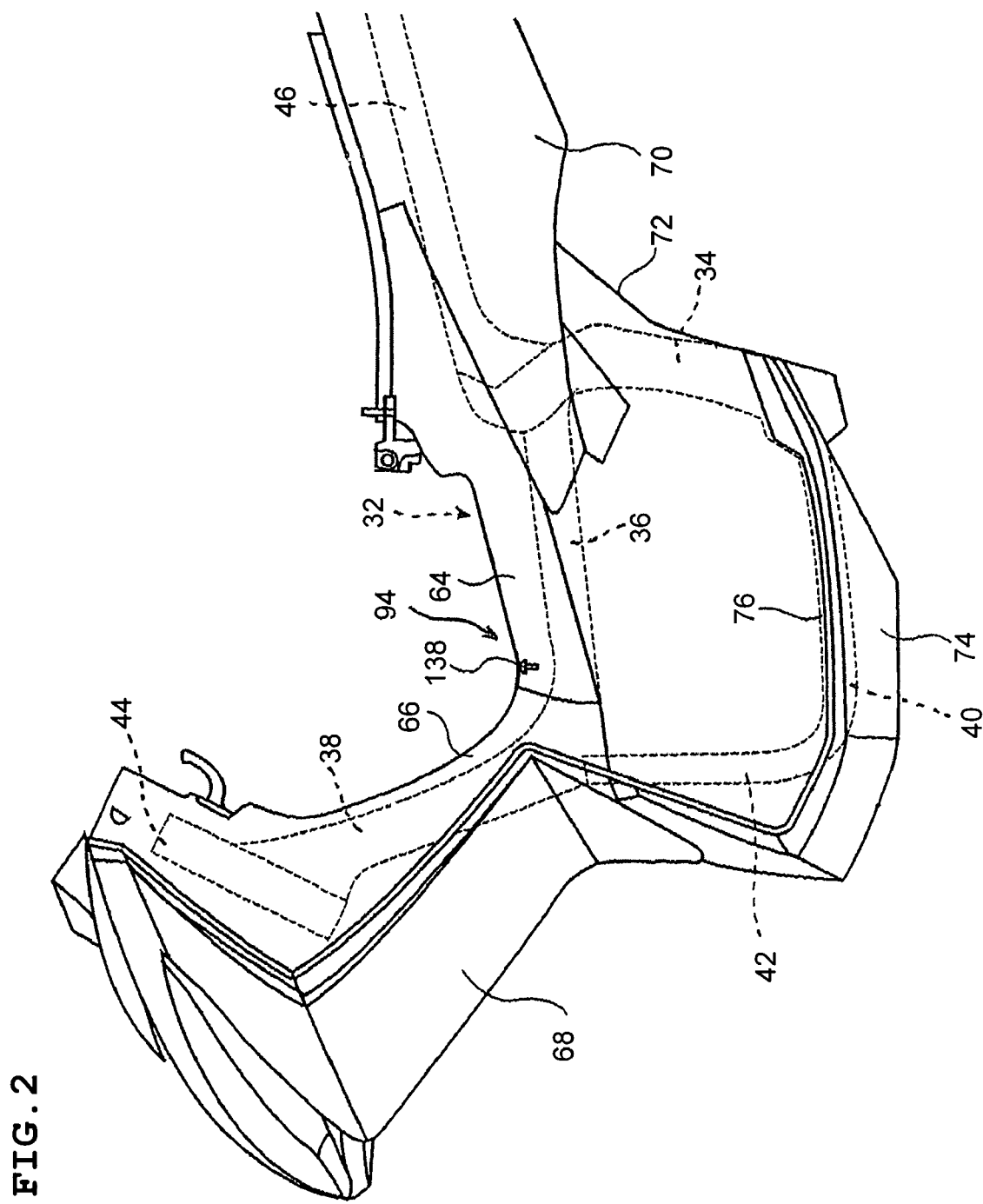
FIG. 2 illustrates a side elevation view of a major portion of the moped of FIG. 1, with a frame of this portion being shown in dotted line.

With reference to FIGS. 1 and 2, an overall construction of a moped 30 configured in accordance with a preferred embodiment of the present invention is described. The moped 30 merely exemplifies one type of a wheeled vehicle. The fixing structures described below can be used for other types of wheeled vehicles such as, for example, motorcycles and scooters. Such applications will be apparent to those of ordinary skill in the art in light of the description herein.

As used throughout this description, the terms "forward" and "front" mean at or to the side where the leading end of the moped 30 is located, and the terms "rear" and "rearward" mean at or to the opposite side of the front side, unless indicated otherwise or otherwise readily apparent from the context used. Also, as used in this description, the term "horizontally" means that the subject portions, members or components extend substantially parallel to the ground when the moped 30 is upright. The term "vertically" means that portions, members or components extend substantially perpendicular to those that extend horizontally.

The moped 30 includes a frame 32 (FIG. 2) that defines a base of the moped 30. The frame 32 preferably includes a pair of first vertical frame sections 34, a first horizontal frame section 36, a second vertical frame section 38, a second horizontal frame section 40, a third vertical frame section 42, a head pipe 44, a pair of seat rails 46, a pair of foot board bases and multiple cross bars.

The second vertical frame section 38, the second horizontal frame section 40 and the third vertical frame section 42 preferably extend on a longitudinal center plane LCP (FIG. 4) of the moped 30 that extends vertically and from front to rear when the moped 30 stands normally on the ground. The respective first vertical frame sections 34, seat rails 46 and foot board bases are transversely spaced apart from each other so as to extend substantially symmetrically on both sides of the longitudinal plane of the vehicle. That is, the moped 30 in the illustrated preferred embodiment is substantially symmetrical relative to the longitudinal center plane LCP. The cross bars couple the respective first vertical frame sections 34, seat rails 46 and foot board bases with the other portions of the frame 32. Those components of the frame 32 are preferably welded with each other or joined by proper fasteners such as, for example, bolts and nuts.

The first vertical frame sections 34 swingably support an engine unit 50 and a rear wheel 52 via a pair of swing arms. The engine unit 50 preferably includes an internal combustion engine and a transmission to power the moped 30. A rear end on the right hand side of the engine unit 50 preferably accommodates the axle of the rear wheel 52. Preferably, a suspension 54 extends between the engine unit 50 and the seat rail 46 on the left hand side of the moped 30.

The illustrated first horizontal frame section 36 extends forward from a top end portion of the first vertical frame section 34 on the right hand side toward a bottom end of the second vertical frame section 38. The first horizontal frame section 36 and the second vertical frame section 38 together define a main frame portion of the moped 30.

The head pipe 44 is preferably welded to the top of the second vertical frame section 38. The head pipe 44 accommodates a steering shaft that includes a pair of front forks 56 at a bottom portion. A front wheel 58 is interposed between the front forks 56. A handle bar 60 extends substantially horizontally at a top portion the steering shaft. The rider steers the moped 30 by turning the handle bar 60. The handle bar 60 preferably includes a throttling device that controls the power of the engine, and brake levers that stop the rotation of the front and rear wheels 58, 52 through braking devices.

The seat rails 46 supports a seat 62 for the rider. The seat 62 is preferably a tandem type such that two riders can ride the moped at the same time.

The second horizontal frame section 40 extends forward from the first vertical frame sections 34 via one of the cross bars. That is, the second horizontal frame section 40 is located below the first horizontal frame section 36. The third vertical frame section 42 extends upward from a forward end of the second horizontal frame section 40 and is coupled with the second vertical frame section 38. In the illustrated preferred embodiment, the second horizontal frame section 40 and the third vertical frame section 42 are unitarily formed from a single material and together define a sub frame portion of the moped 30.

The foot board bases preferably extend forward from the respective bottom ends of the first vertical sections 34. Preferably, a bracket extending transversely from the second horizontal frame section 40 supports a front portion of each foot board base.

The frame 32 has various shapes in cross-section. For example, the illustrated first horizontal sections 36 preferably have a shape of the letter L or U in section. The illustrated first and second horizontal frame sections 36, 40, the second and third vertical frame sections 38, 42 and the head pipe 44 generally have a substantially round shape or a substantially rectangular shape in section. The illustrated seat rails 46 generally have a substantially U-shaped configuration in section.

Multiple covers are provided to cover the frame 32. The covers in the illustrated preferred embodiment include a center cover 64, a leg shield 66, a front cover 68, a pair of side covers 70, a pair of lower covers 72, and a bottom cover 74. A pair of foot boards 76 is also provided to support the rider's feet.

The center cover 64 covers a top surface of the first horizontal frame portion 36 and front portions of the respective seat rails 46. The leg shield 66 covers a rear surface of the second vertical frame section 38. The front cover 68 covers a front surface of the second vertical frame section 38. That is, the second vertical frame section 38 is interposed between the leg shield 66 and the front cover 68.

Figure 4:
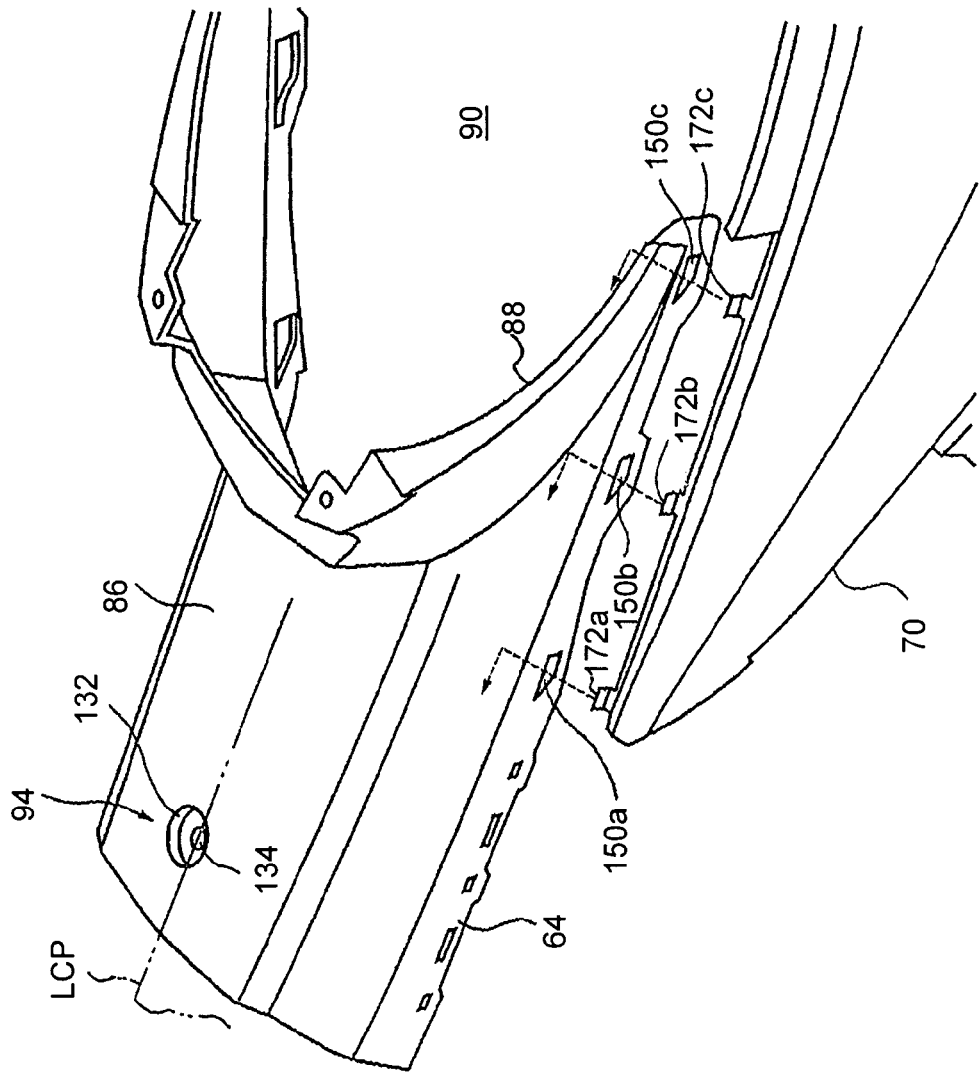
FIG. 4 illustrates a perspective view of the center cover of FIG. 3 from a rear left side, with a portion of one of side covers also being shown.

In the illustrated preferred embodiment, the center cover 64 extends substantially horizontally along the first horizontal frame section 36 and the seat rails 46. A forward half of the center cover 64 is curved upward toward its center line from both sides to substantially surround the first horizontal frame section 36. The forward half of the center cover 64 has a generally flat surface 86 in a top portion. The forward half of the center cover 64 extends gradually upward to a rear half thereof at which the seat 62 is mounted. The rear half of the center cover 64 and the side covers 70 together define an opening 88 (FIG. 4). A helmet storage box 90 preferably is disposed below the opening 88. The rider thus can store his or her helmet in the storage box 90 through the opening 88 by removing the seat 62. The helmet storage box 90 is preferably attached to the seat rail 46.

The illustrated leg shield 66 extends substantially vertically along the second vertical frame section 38. The leg shield 66 is opposed to the knees of the rider. A center portion of the leg shield 66 preferably protrudes rearward. A rear-most area 92 (FIG. 5) of the leg shield 66 extends substantially horizontally along a forward end of the first horizontal frame section 36. The leg shield 66 gradually transitions to the horizontally extending rear-most area 92 from its forward area that extends substantially vertically.

The side covers 70 cover respective side surfaces of the seat rails 46. Preferably, a center portion 93 of each side cover 70 protrudes outward to be spaced apart from the longitudinal center plane LCP.

The lower covers 72 extend substantially vertically below the center cover 64 on both sides of the moped 30 so as to cover side surfaces of the first vertical frame sections 34 and side surfaces of the third vertical frame section 42. The foot boards 76 extend below the lower covers 72 and extend transversely outward over the foot board bases. Each foot board 76 is attached to a top surface of each foot board base. The bottom cover 74 extends substantially horizontally below the foot boards 76 to generally cover bottom surfaces of the first vertical frame sections 34 and a bottom surface of the third vertical frame section 42.

The center cover 64, the leg shield 66, the front cover 68, the side covers 70, the lower covers 72 and the bottom cover 74 cover substantially the entire frame 32 of the moped 30. In addition, a portion of the engine unit 50 or components for the engine unit 50 may be disposed within a space surrounded by the center cover 64, the lower covers 72 and the bottom cover 74. In the illustrated preferred embodiment, at least an air cleaner is disposed within the space.

The front cover 68 preferably includes a pair of recesses in a forward portion of the front cover 68 on both sides of the longitudinal center plane LCP. Head lamp assemblies 78 are inserted into the respective recesses to be arranged at the forward-most end of the front cover 68.

In the illustrated preferred embodiment, the moped 30 includes a front fender 82 and a rear fender 84 in addition to the foregoing covers that cover the frame 32. The front fender 82 covers a top portion of the front wheel 58, and the rear fender 84 covers a rear top portion of the rear wheel 52.

The covers 64, 66, 68, 70, 72, 74, the foot boards 76 and the fenders 82, 84 are preferably made of resin. In the illustrated preferred embodiment, some covers such as, for example, the center cover 64 and the leg shield 66 are preferably made of PP (Poly-Propylene) resin to provide a desired amount of strength. Some other covers such as, for example, the front cover 68 and the side covers 70 are preferably made of ABS (Acrylonitorile-Butadiene-Styrene) resin so as to maintain an attractive appearance. This is because the ABS resin can be coated. In general, the PP resin is stronger than the ABS resin.

With reference to FIGS. 2-9, the center cover 64 and the leg shield 66 are preferably joined together and attached to the first horizontal frame section 36 at a reference position 94 of the moped 30. The moped 30 includes only one reference position 94 on the frame for all of the cover 64, 66, 68, 70, 72, 74. That is, the reference position 94 is a sole reference point by which the respective covers 64, 66, 68, 70, 72, 74 are directly or indirectly attached to the frame 32. The reference position 94 is preferably detennined to be at a point on the longitudinal center plane LCP in a front end and top surface area of the first horizontal frame section 36.

The center cover 64 and the leg shield 66 in the illustrated preferred embodiment are also joined with each other at four first engagement structures 95 and three second engagement structures 96. The engagement structures 95, 96 preferably are located adjacent to the reference position 94.

Figure 6:
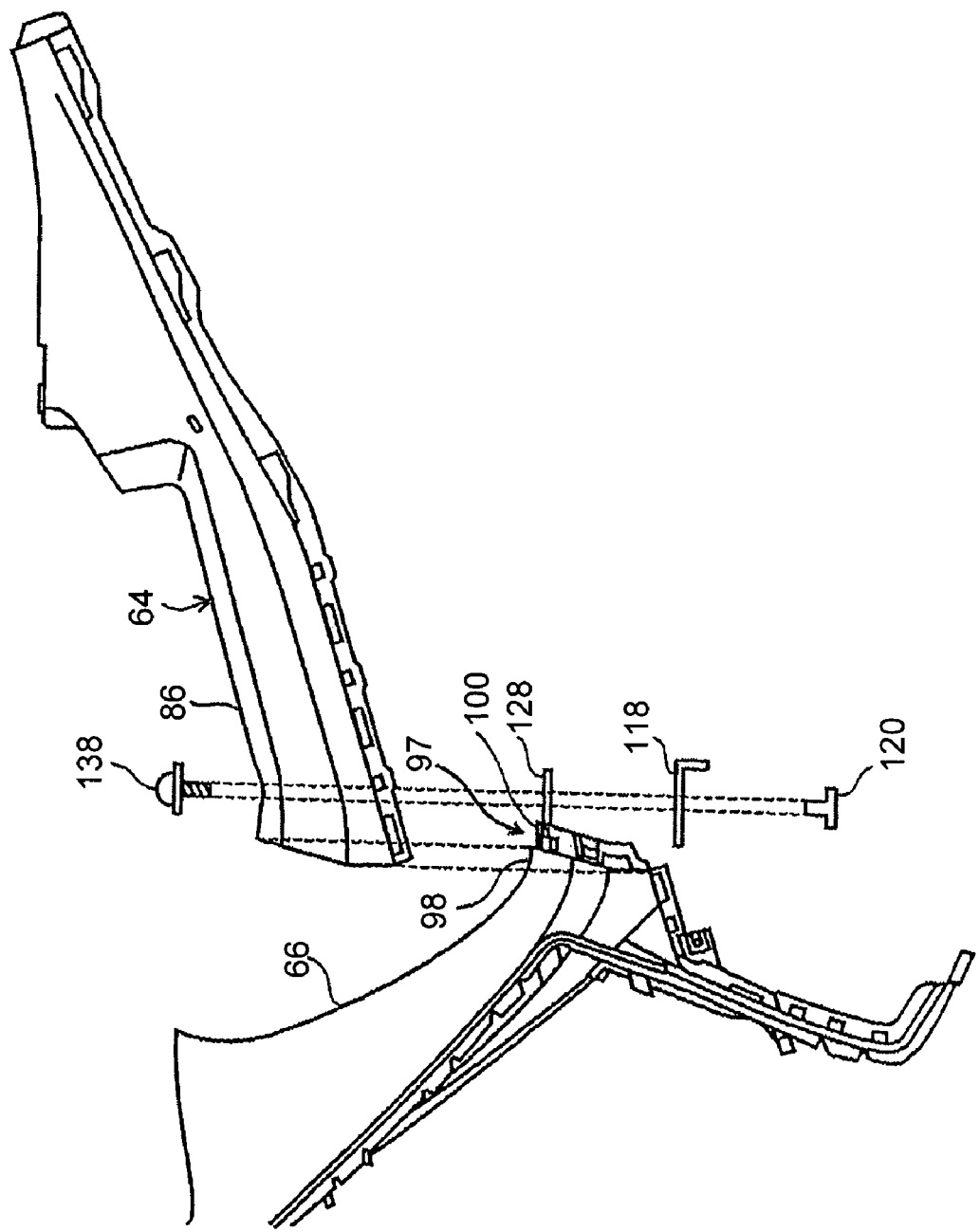
FIG. 6 illustrates a developed view of the coupling structure for the center cover and the leg shield.
Figure 7:
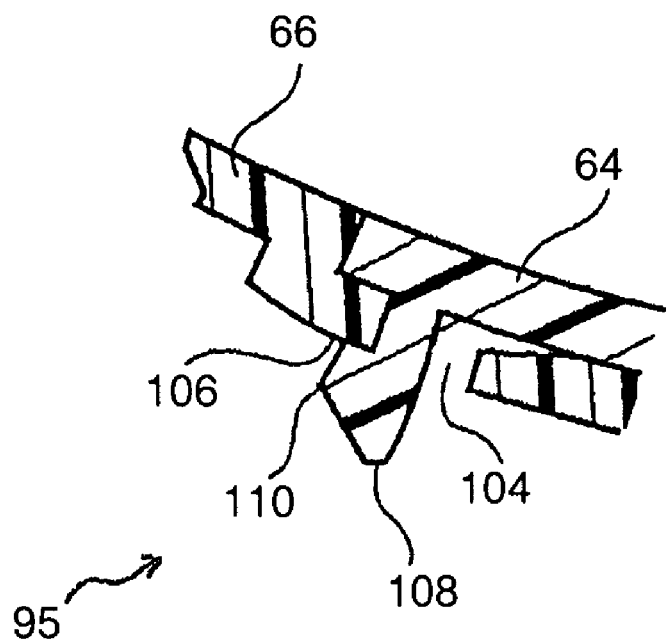
FIG. 7 illustrates a cross-sectional view taken along the line 7-7 of FIG. 5.
Figure 8:
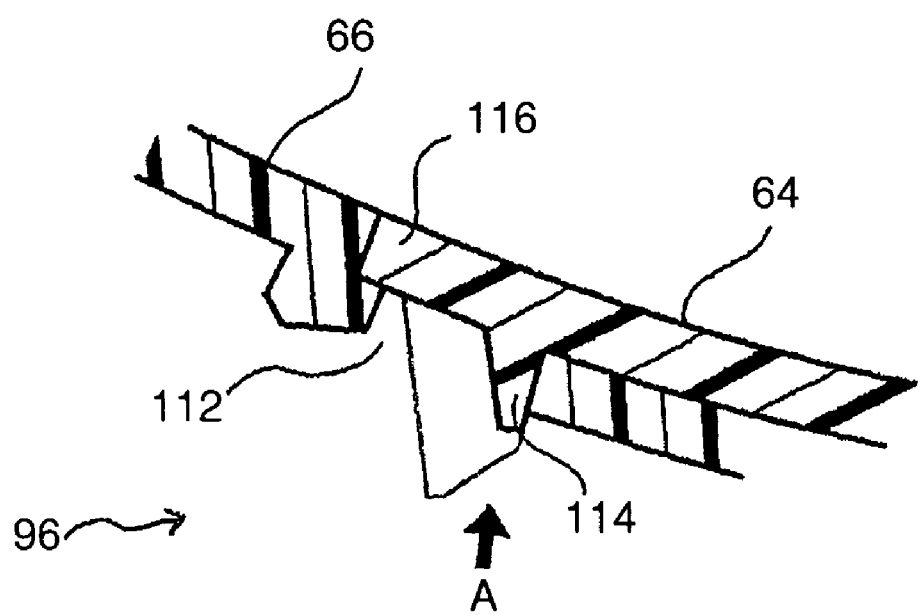
FIG. 8 illustrates a cross-sectional view taken along the line 8-8 of FIG. 5.

As best shown in FIG. 6, the leg shield 66 preferably includes a step 97 that defines a first step portion 98 and a second step portion 100 at the rear-most area 92. The second step portion 100 and a forward-most area of the center cover 64 overlap with each other. In other words, the forward-most area of the center cover 64 overlays the rear-most portion 92 of the leg shield 66. A forward end of the center cover 64 abuts on a rear end of the leg shield 66 when the forward-most area of the center cover 64 overlays the rear-most area 92 of the leg shield 66. A top surface of the first step portion 98 is preferably flush with the top surface 86 of the center cover 64.

In one variation, the forward-most portion of the center cover 64 may include the step 97. The rear-most portion 92 of the leg shield 66 in this alternative arrangement overlays the forward-most portion of the center cover 64.

The first and second engagement structures 95, 96 are preferably provided between the second step portion 100 of the rear-most area 92 of the leg shield 66 and the forward-most area of the center cover 64. Preferably, the respective first and second engagement portions 95, 96 are disposed along the second step portion 100 at desired intervals.

In each first engagement structure 95, the leg shield 66 preferably includes an opening 104 (FIG. 7) in the second step portion 100. An engagement projection 106 is provided at one end of the opening 104 and extends toward the center cover 64. The center cover 64 preferably includes a hook 108 that can be inserted into the opening 104. The hook 108 has an engagement projection 110 extending toward the leg shield 66. The engagement projections 106 and 110 are nested with each other to prevent the projections 106 and 110 from separating from one another when the hook 108 is inserted into the opening 104. Accordingly, the top surfaces of the center cover 64 and the leg shield 66 are maintained flush with each other.

In each second engagement structure 96, the leg shield 66 preferably includes an opening 112 (FIG. 8) in the second step portion 100. The center cover 64 includes an engagement projection 114 preferably having a substantially U-shaped configuration in the view A of FIG. 8. The engagement projection 114 is inserted into the opening 112. A back side of the engagement projection 114 and a terminal end 116 of the center cover 64 abuts against a peripheral edge of the opening 112. The center cover 64 and the leg shield 66 are thus fixed in both of a front to rear direction and a transverse direction of the moped 30.

Figure 5:
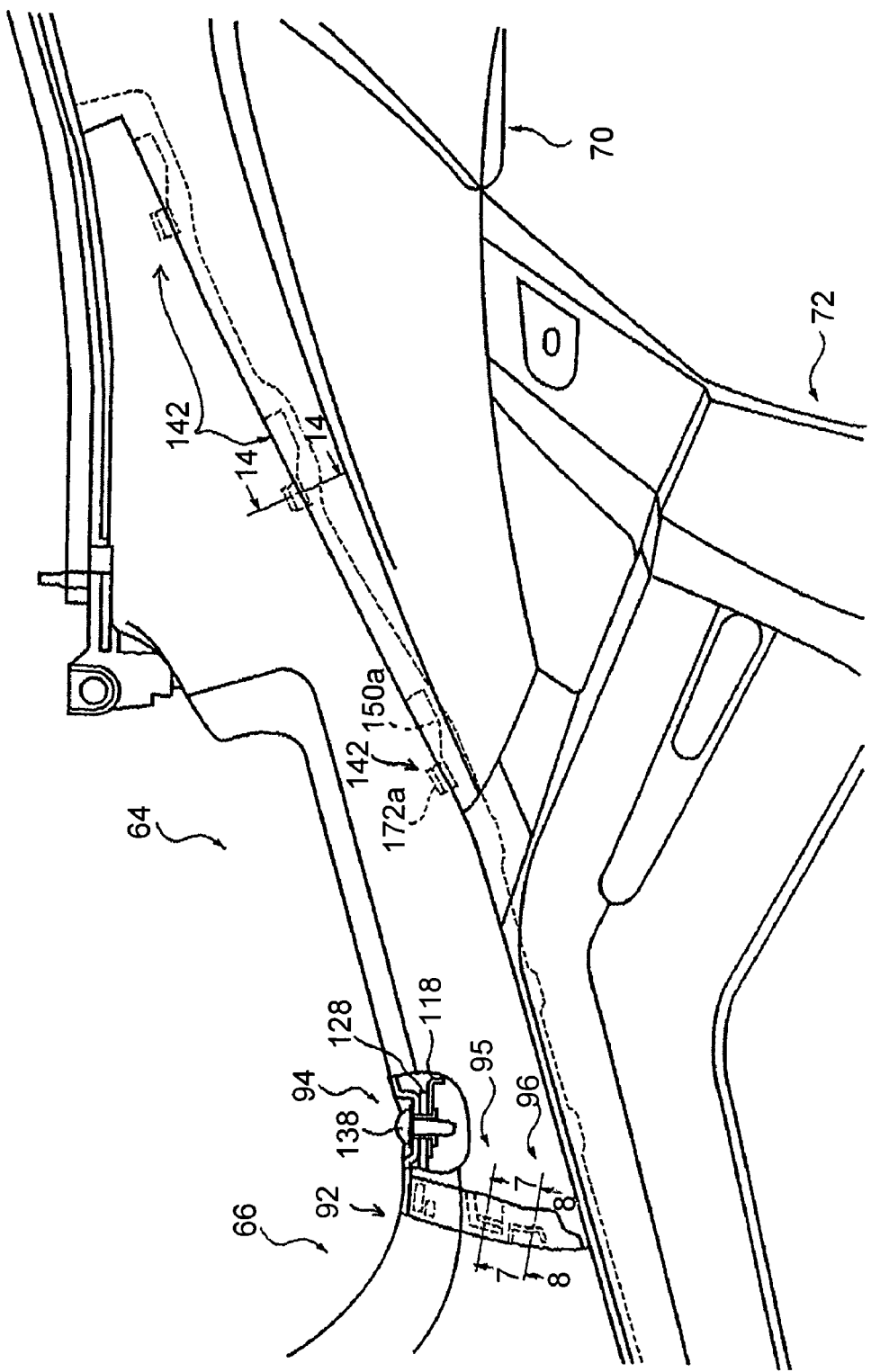
FIG. 5 illustrates a side elevation view of the major portion of the moped to show a coupling structure for the center cover and a leg shield, and another coupling structure for the center cover and the side covers, the former coupling structure being shown in partial cross-section.
Figure 9:
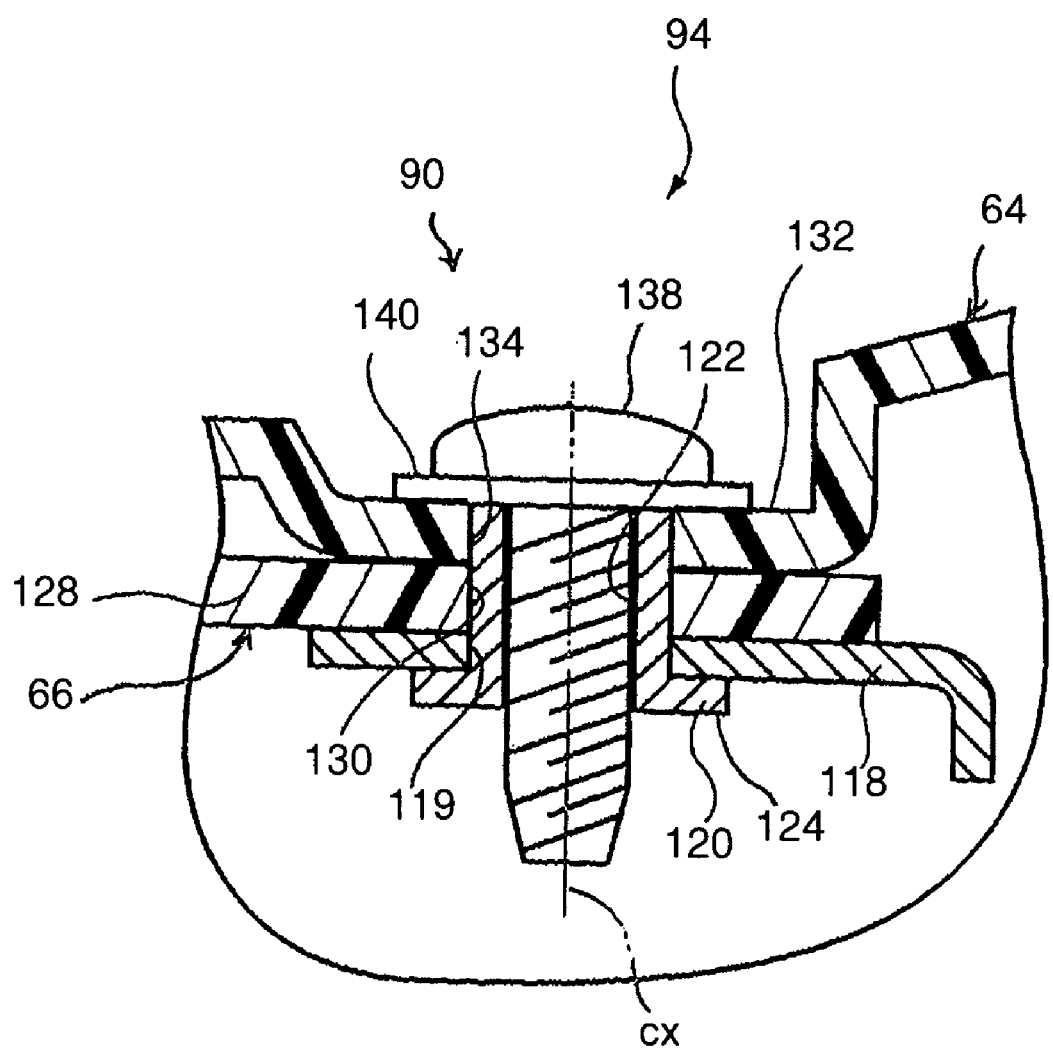
FIG. 9 illustrates an enlarged, partial cross-sectional view to show the coupling structure.

With reference to FIGS. 5, 6 and 9, the first horizontal frame section 36 preferably includes a stay 118 on a top surface of the first horizontal frame section 36. The stay 118 includes an aperture 119 (FIG. 9) that has a round cross-sectional shape. A center of the aperture 119 is located at the reference position 94. A female screw member 120 preferably is inserted into the aperture 119. The female screw member 120 is preferably a generally cylindrical and internally hollowed member. An aperture 122 of the female screw member 120 extends along a center axis CX of the member 120. Because the center of the aperture 119 of the stay 118 is located at the reference position 94, the center axis CX is located at the reference position 94. The aperture 122 is threaded and preferably has a substantially round cross-sectional shape so as to define a bolt hole. The female screw member 120 preferably has a flange 124 at a bottom thereof. The flange 124 is welded to a bottom of the stay 118 such that a major portion of the female screw member 120 extends upward from the stay 118.

The leg shield 66 preferably includes a projection 128 that extends rearward from the rear-most area 92. The projection 128 may be integrally formed with the leg shield 66. Alternatively, a separable member such as, for example, a metal plate may be attached to the leg shield 66. The projection 128 has an aperture 130. An inner diameter of the aperture 130 preferably is equal to an outer diameter of the body portion of the female screw member 120. The top surface 86 of the center cover 64 preferably has a recessed portion 132 that has an aperture 134 at its bottom. An inner diameter of the aperture 134 preferably is equal to the outer diameter of the body portion of the female screw member 120. The projection 128 of the leg shield 66 and the recessed portion 132 of the center cover 64 are laid onto the stay 118 one by one such that the female screw member 120 is inserted into the apertures 130, 134.

A bolt 138 having a flange 140 next to a head thereof preferably is inserted into the bolt hole, i.e., the threaded aperture 122 of the female screw member 120. A center axis of the bolt 138 is aligned with the center axis CX of the female screw member 120. In other words, the bolt 138 is located at the reference position 94. The head of the bolt 138 is accommodated within the recess 132 of the center cover 64. The center cover 64, the leg shield 66 and the stay 118 are interposed between the flange 124 of the female screw member 120 and the flange 140 of the bolt 138. The bolt 138 is screwed until a top end of the female screw member 120 tightly abuts on a bottom surface of the flange 140 of the bolt 138.

The flange 140 of the bolt 138 can be omitted if the head of the bolt 138 has a bottom surface that has a sufficient area to abut against the center cover 64.

Any fastening structures other than the structure described above is applicable for attaching the center cover 64 and the leg shield 66 to the first horizontal frame section 36. For example, the respective positions of the bolt 138 and the female screw member 120 can be reversed. That is, a bolt is welded to the stay 118 to extend upward through the aperture 119 via a collar that has a flange atop thereof. A nut is screwed onto an extended end of the bolt.

The center cover 64 and the leg shield 66 may be further attached to the frame 32 at locations other than the reference position 94. For example, the illustrated leg shield 66 is affixed to a rear portion of the head pipe 44. Because the actual leg shield 66 may be longer or shorter than the designed leg shield due to dimensional variations resulting from tolerances, the leg shield 66 preferably includes a slot at the attachment location on the head pipe 44. A bolt is inserted into the slot and further into a bolt hole of the head pipe 44 to fasten the leg shield 66 onto the head pipe 44. The slot of the leg shield 66 allows the bolt to be exactly placed in the bolt hole.

In the illustrated preferred embodiment, the body portion of the female screw member 120 isolates the inner surfaces of the apertures 119, 130, 134 from the threaded surface of the bolt 138. Because the inner diameters of the apertures 119, 130, 134 correspond with the outer diameter of the body portion of the female screw member 120, the center cover 64 and the leg shield 66 are located exactly at the reference position 94.

As thus described above, the illustrated center cover 64 and leg shield 66 abut each other to form the flush surface and overlap each other to include the reference position 94. Also, the center cover 64 and the leg shield 66 are together attached to the first horizontal frame section 36 at the reference position 94. Accordingly, no space exists between the center cover 64 and the leg shield 66. In addition, the center cover 64 and the leg shield 66 abut against each other at a location adjacent to the reference position 94. Because the distance between the location and the reference position 94 is short enough and the dimensional variations due to tolerances in the production processes of the covers 64, 66 are small, the likelihood that a space will exist is greatly reduced. As a result, the appearance of the moped 30 is effectively maintained.

In the illustrated preferred embodiment, the forward-most area of the center cover 64 is disposed over the rear-most area of the leg shield 66. This is convenient for maintenance services of the components under the center cover 64 because the center cover 64 may be detached without removing the leg shield 66.

With reference to FIGS. 3-5 and 10-17, the side covers 70 preferably are coupled with the center cover 64 at locations that are spaced apart from the reference position 94. Preferably, one side cover 70 is coupled with the center cover 64 on the left hand side, while another side cover 70 is coupled with the center cover 64 on the right hand side. The coupling structures for each of the side covers 70 to the center cover 64 are preferably the same. Thus, only the coupling structure of the left hand side will described below, the coupling structure on the right hand side is the same.

Because the coupling locations of the center cover 64 and the side covers 70 are spaced apart from the reference position 94 and the side covers 70 may have the dimensional variations due to tolerances, the locations are determined with less precision than the reference position 94. In other words, each coupling location is determined within a certain area rather than at a fixed point. The illustrated moped 32 includes three first type coupling structures 142 and one second type coupling structure 144, although other combinations of coupling structure may be used.

Figure 3:
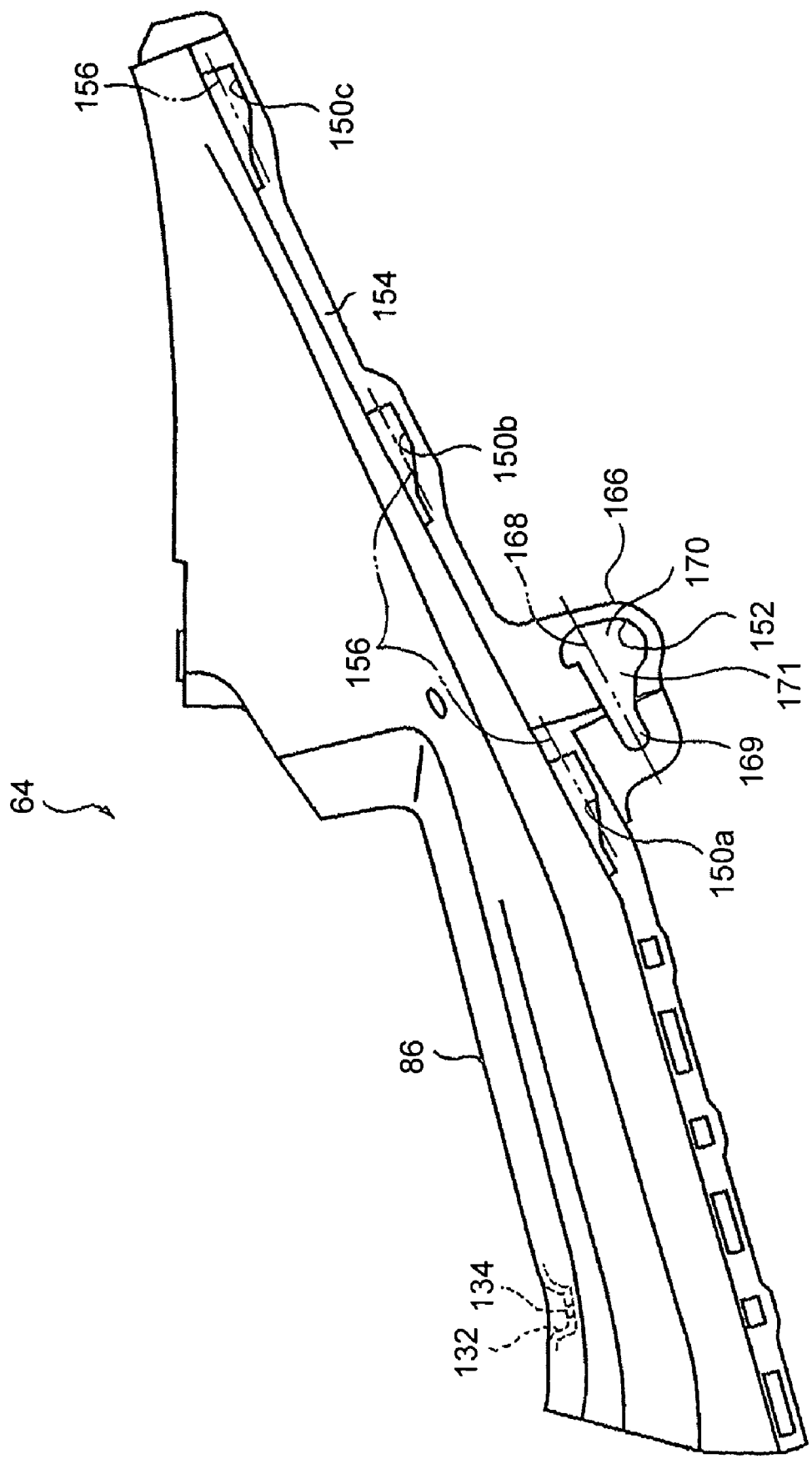
FIG. 3 illustrates a side elevation view of a center cover of the moped.
Figure 15:
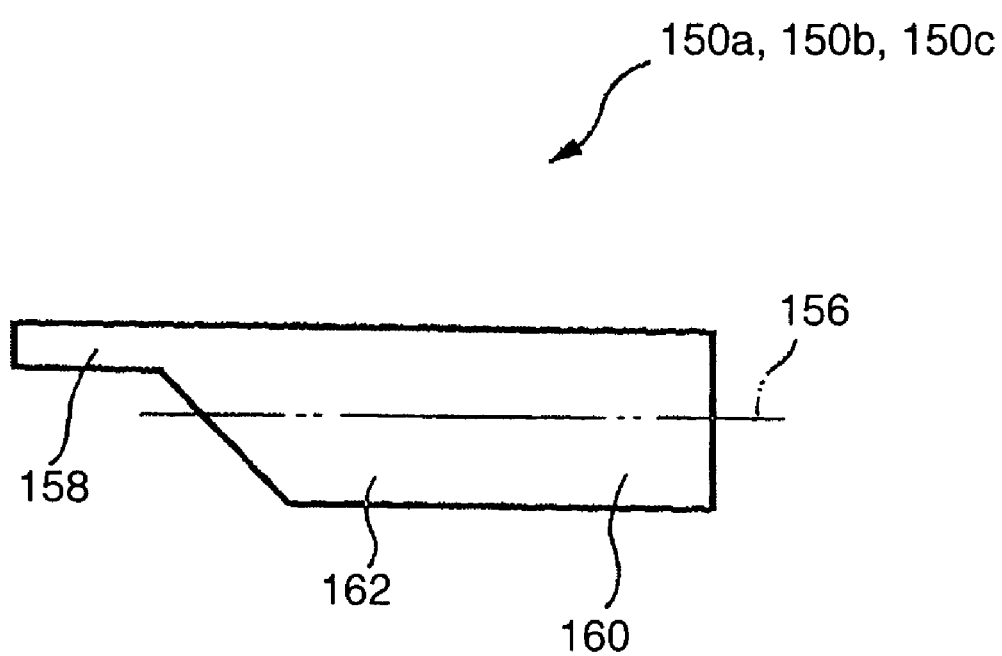
FIG. 15 illustrates a schematic view of one slot of FIG. 13.

With reference to FIGS. 3 and 15, the center cover 64 includes three small slots 150a, 150b, 150c and one large slot 152 on each side. The small slots 150a, 150b, 150c define a portion of the first type coupling structures 142. The large slot 152 defines a portion of the second type coupling structure 144. The respective small slots 150a, 150b, 150c are preferably disposed at a bottom peripheral edge 154 of the center cover 64. The seat 62 is preferably is arranged above a portion of the peripheral edge 154 where the slots 150a, 150b, 150c are disposed.

The illustrated slots 150a, 150b, 150c are aligned with each other. That is, the respective slots 150a, 150b, 150c are elongated to have a longitudinal axis 156, and the respective longitudinal axes 156 are aligned with each other.

The slot 150a is disposed at a forward-most position. The slot 150c is disposed at a rear-most position. The slot 150b is interposed between the slots 150a and 150c. Because the center cover 64 inclines upward and rearward, the slot 150c is located higher than the slots 150a and 150b, and the slot 150b is located higher than the slot 150a.

Each slot 150a, 150b, 150c is configured to have a substantially rectangular shape. A forward end portion 158 (FIG. 15) is preferably narrower than a rear end portion 160. A mid portion 162 gradually becomes narrower toward the forward end portion 158 from the rear end portion 160.

The bottom peripheral edge 154 of the center cover 64 preferably includes a flange 166 that extends downward. The illustrated flange 166 is located between the slots 150a and 150b and closer to the slot 150a than to the slot 150b. The flange 166 has a relatively large area. The large slot 152 is disposed in the area of the flange 166. In the illustrated preferred embodiment, the small slots 150a, 150b and the large slot 152 are arranged to form a triangle with each other. Every angle of the triangle is preferably an acute angle due to the arrangement of the slots 150a, 150b and the slot 152.

The large slot 152 is elongated so as to have a longitudinal axis 168. The longitudinal axis 168 of the large slot 152 does not align with the longitudinal axes 156 of the small slots 150*a*, 150*b* and 150*c*. The longitudinal axis 168, however, preferably extends substantially parallel to the longitudinal axes 156. A forward end portion 169 (FIG. 3) is preferably narrower than a rear end portion 170. A mid portion 171 gradually becomes narrower toward the forward end portion 169 from the rear end portion 170. The large slot 152 is configured to have a substantially mushroom-like shape.

Figure 10:
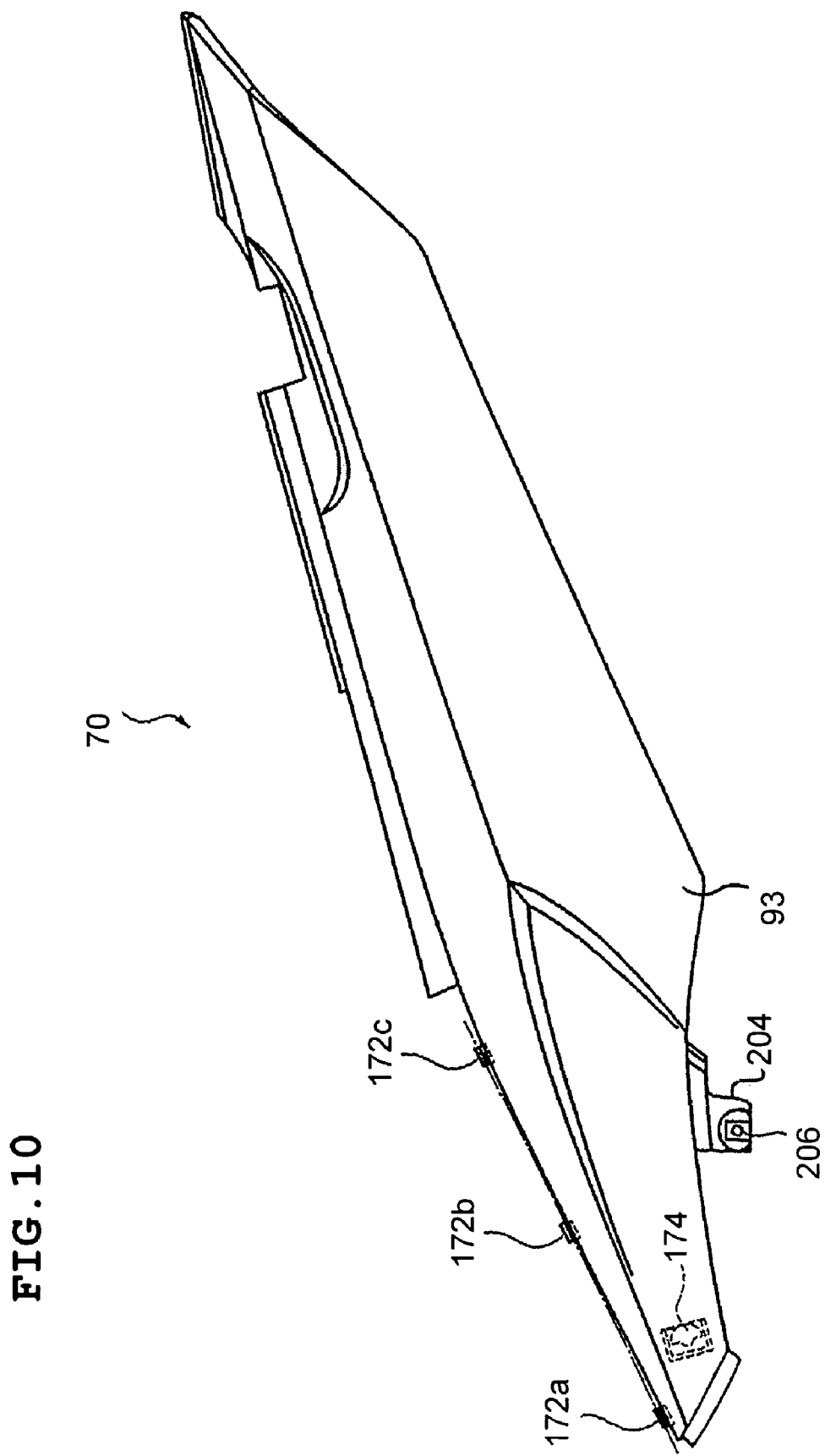
FIG. 10 illustrates a side elevation view of the side cover attached to a left side of the vehicle.
Figure 11:
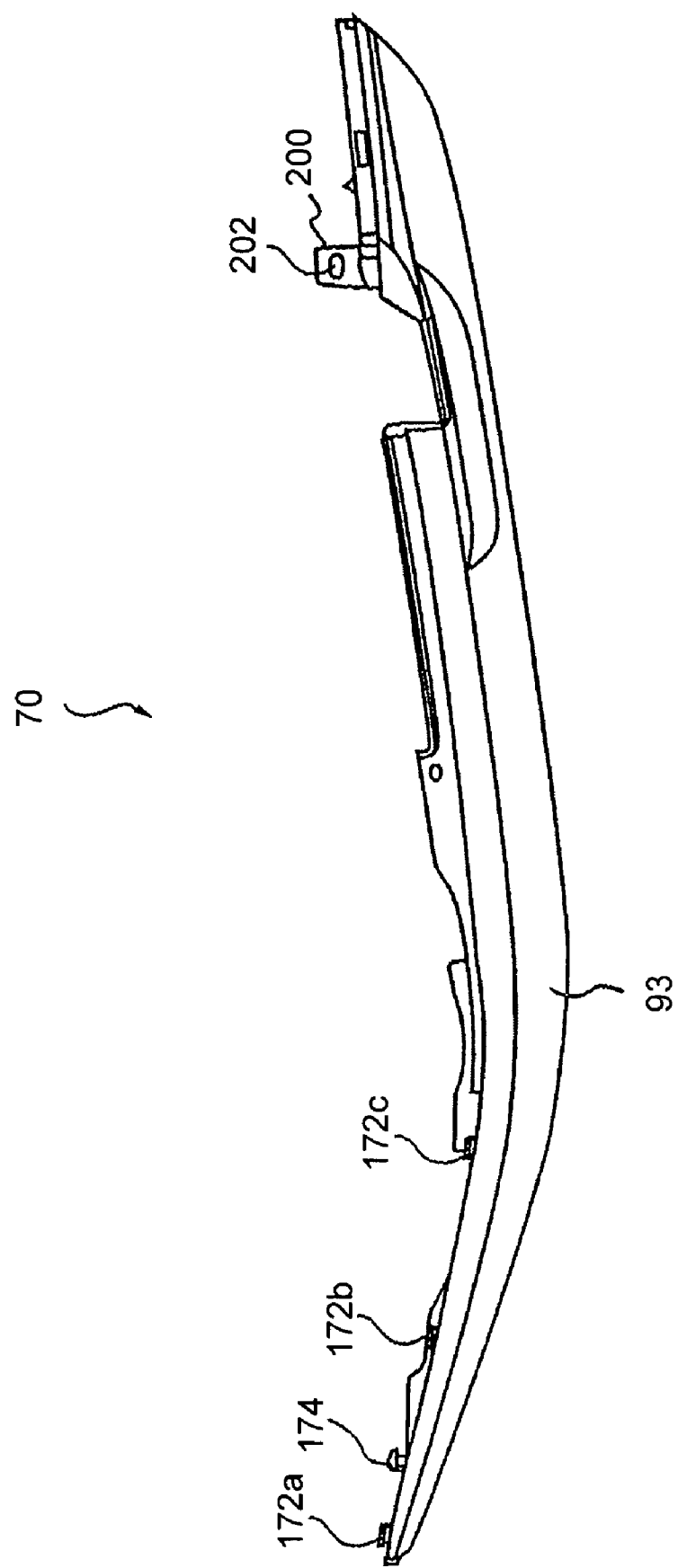
FIG. 11 illustrates a top plan view of the side cover of FIG. 10.
Figure 12:
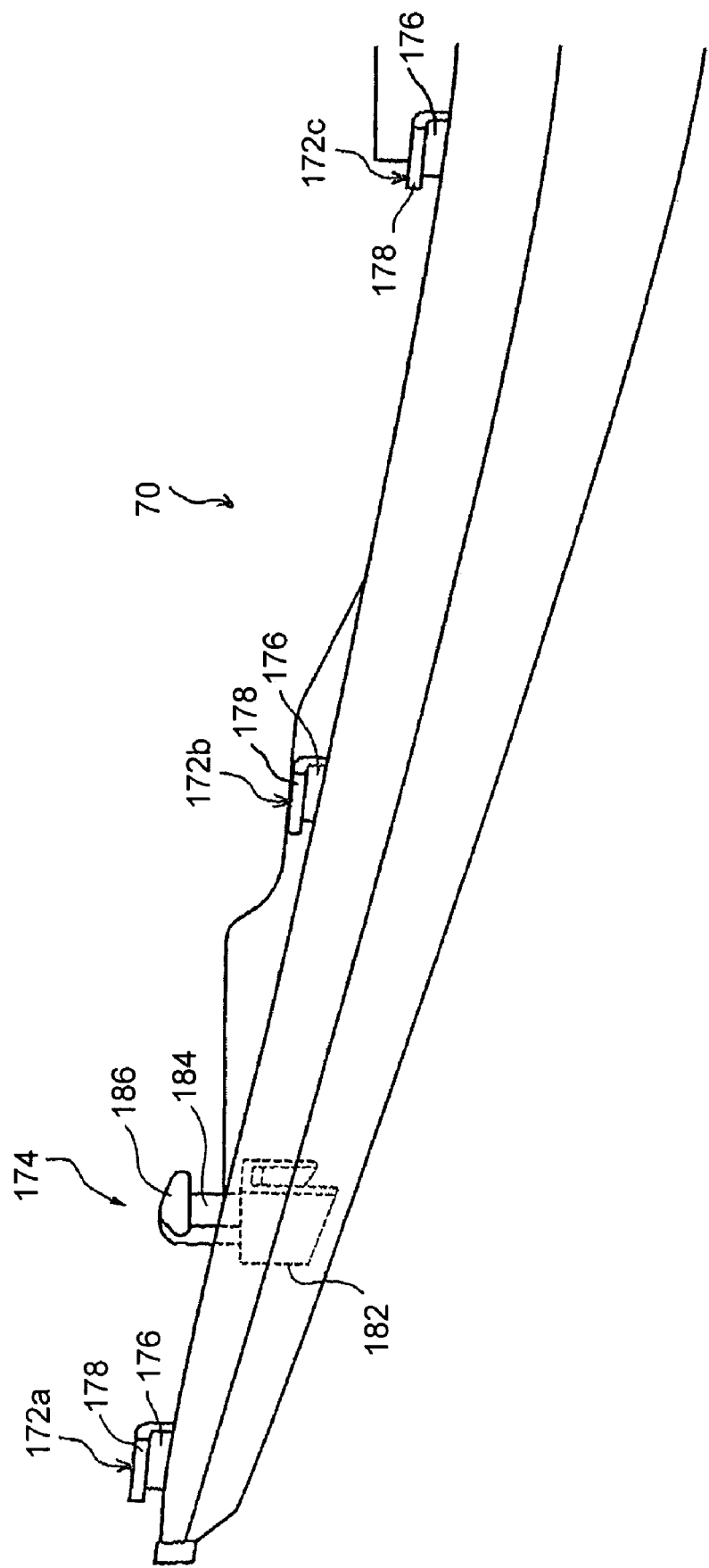
FIG. 12 illustrates an enlarged top plan view of the side cover to show projections thereof for the coupling structure with the center cover.
Figure 13:
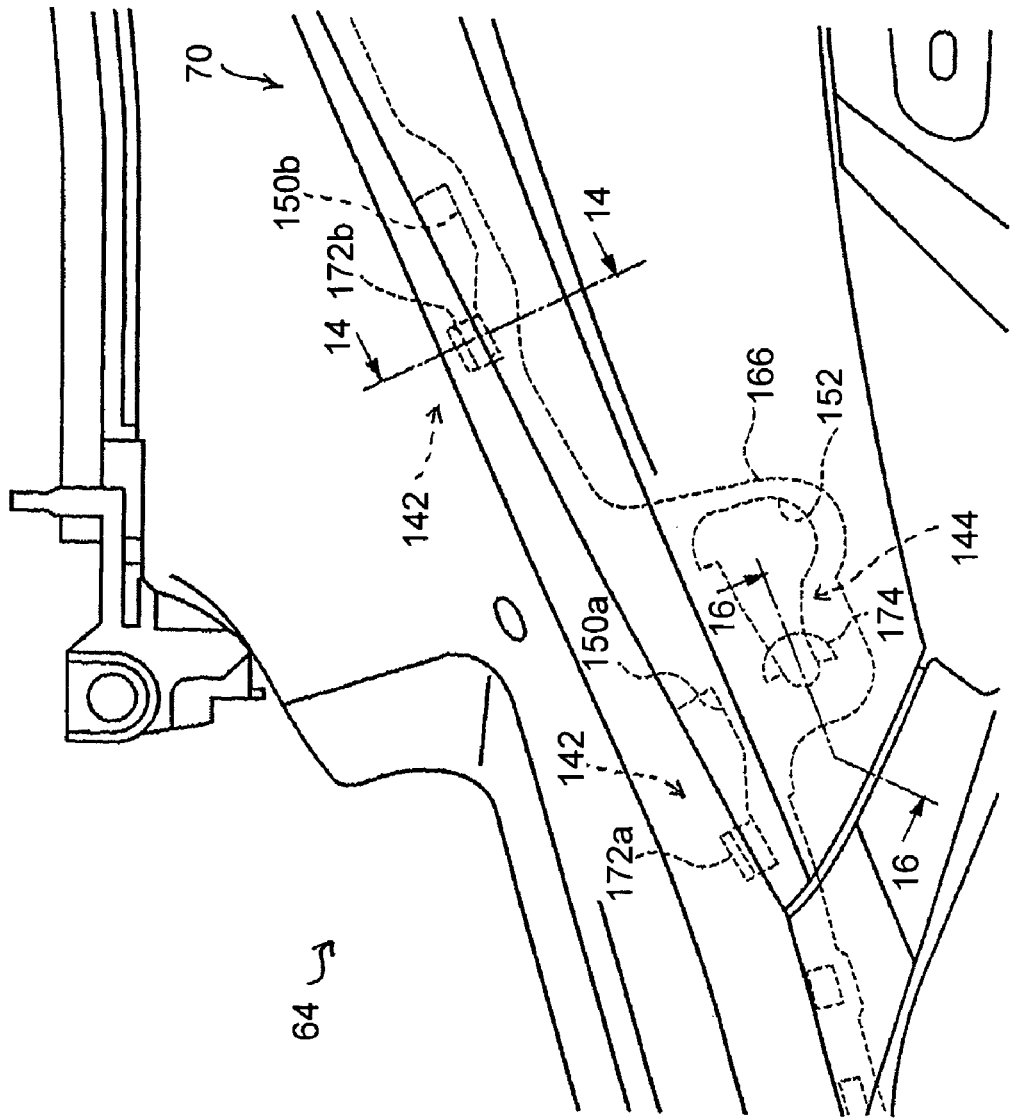
FIG. 13 partially illustrates a side elevation view of the center and side covers to show the coupling structure for the center and side covers, the projections and slots of the structure are shown in dotted line.

With reference to FIGS. 10-12, each side cover 70 preferably includes three small projections or engaging pieces 172*a*, 172*b*, 172*c* and one large projection or engage piece 174 which correspond to the small slots 150*a*, 150*b*, 150*c* and the large slot 152 of the center cover 64, respectively. The small projections 172*a*, 172*b*, 172*c* define another portion of the first type coupling structures 142. The large projection 174 defines another portion of the second type coupling structure 144. The small projections 172*a*, 172*b*, 172*c* are disposed on a top periphery of the side cover 70. The small projections 172*a*, 172*b*, 172*c* are preferably integrally formed with each side cover 70.

Each projection 172*a*, 172*b*, 172*c* preferably has a hook shape. More specifically, as best shown in FIG. 12, each projection 172*a*, 172*b*, 172*c* is preferably a thin plate or sheet including a base portion 176 and an engaging portion 178. Preferably, the thickness of each projection 172*a*, 172*b*, 172*c* is substantially equal to the thickness of a body of the side cover 70. The base portion 176 extends substantially horizontally toward the longitudinal center plane LCP of the moped 30 from the top periphery of the side cover 70. The engaging portion 178 extends substantially upward from an end of the base portion 176.

The large projection 174, also as best shown in FIG. 12, preferably includes a base portion 182, a stem portion 184 and a cap portion 186. The large projection 174 is preferably is integrally formed with each side cover 70.

The base portion 182 is preferably a pedestal for the stem portion 184 and extends toward the longitudinal center plane LCP from an inner surface of the side cover 70.

The stem portion 184 extends further toward the longitudinal center plane LCP from the base portion 182. A cross-section of the illustrated stem portion 184 taken along a line normal to an axis of the stem portion 184 is preferably a substantially round shape. Preferably, the stem portion 184 is thicker than the engage portion 178 of each small projection 172*a*, 172*b*, 172*c*.

The cap portion 186 is preferably disposed on the stem portion 184 so as to be closer to the longitudinal center plane LCP than the stem portion 184. A rear half of the illustrated cap portion 186 is configured as a half of a mushroom cap, while the other half, i.e., a front half thereof, is configured as a half of the stem portion 184. That is, the stem portion 184 further extends to the cap portion 186 so as to be the half of the cap portion 186. The rear half of the cap portion 186 has an outer diameter that is greater than an outer diameter of the stem portion 184. In other words, a step is provided between the rear half of the cap portion 186 and the stem portion 184. Thus, the stem portion 184 and the cap portion 186 together define a hook. The cap portion 186 is preferably smaller than the rear end portion of the large slot 152 and is larger than the forward end portion 169 thereof.

With reference to FIGS. 4, 5, 13, 14, 16 and 17, the side covers 70 are joined to the center cover 64 with the first type coupling structures 142 and the second type coupling structure 144. As described above, the first type coupling structures 142 include combinations of the small slots 150*a*, 150*b*, 150*c* and the small projections 172*a*, 172*b*, 172*c*, and the second type coupling structure 144 includes a combination of the large slot 152 and the large projection 174. The second type coupling structure 144 is omitted in FIGS. 4 and 5.

In the first type coupling structures 142, each small projection 172*a*, 172*b*, 172*c* is inserted into the associated small slot 150*a*, 150*b*, 150*c* as best shown in FIG. 4. More specifically, the base portion 176 together with the engage portion 178 is inserted into the rear end portion 160 of the small slot 150*a*, 150*b*, 150*c*. Meanwhile, in the second type coupling structures 144, the large projection 174 is inserted into the large slot 152. More specifically, the stem portion 184 together with the cap portion 186 is inserted into the rear end portion 170 of the large slot 152. Then, all the small projections 172*a*, 172*b*, 172*c* are shifted forward, i.e., toward the forward end portions 158 of the respective small slots 150*a*, 150*b*, 150*c* as indicated by the arrow 194 of FIG. 17. Simultaneously, the large projection 174 is shifted forward, i.e., toward the forward end portions 169 of the large slot 152 as indicated by the arrow 196 of FIG. 17. In other words, each small projection 172*a*, 172*b*, 172*c* slides toward the forward end portion 158 within the small slot 150*a*, 150*b*, 150*c*, while the large projection 174 slides toward the forward end portion 169 within the large slot 152.

Figure 14:
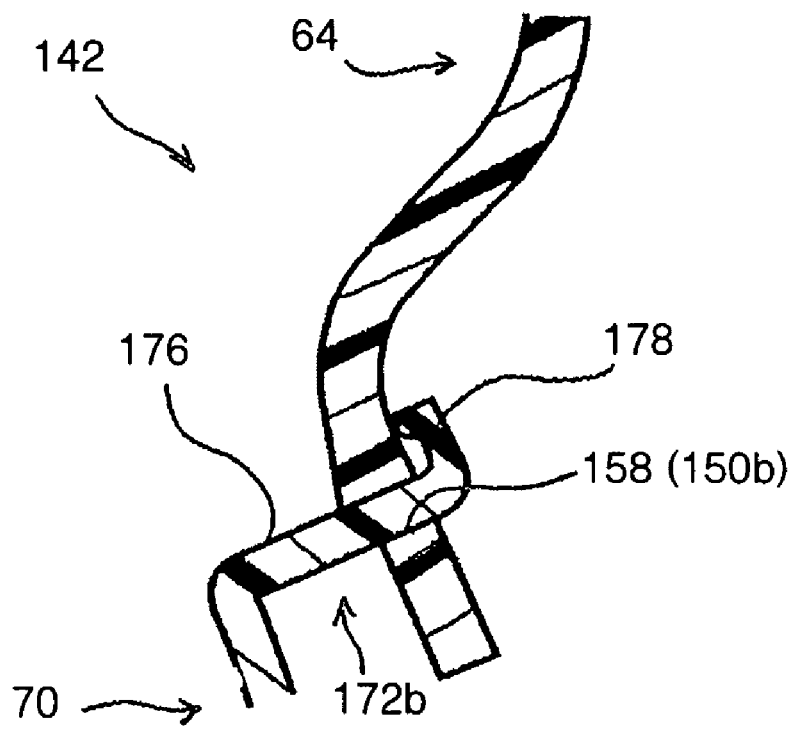
FIG. 14 illustrates a cross-sectional view taken along the line of 14-14 of FIGS. 5 and 13.
Figure 16:
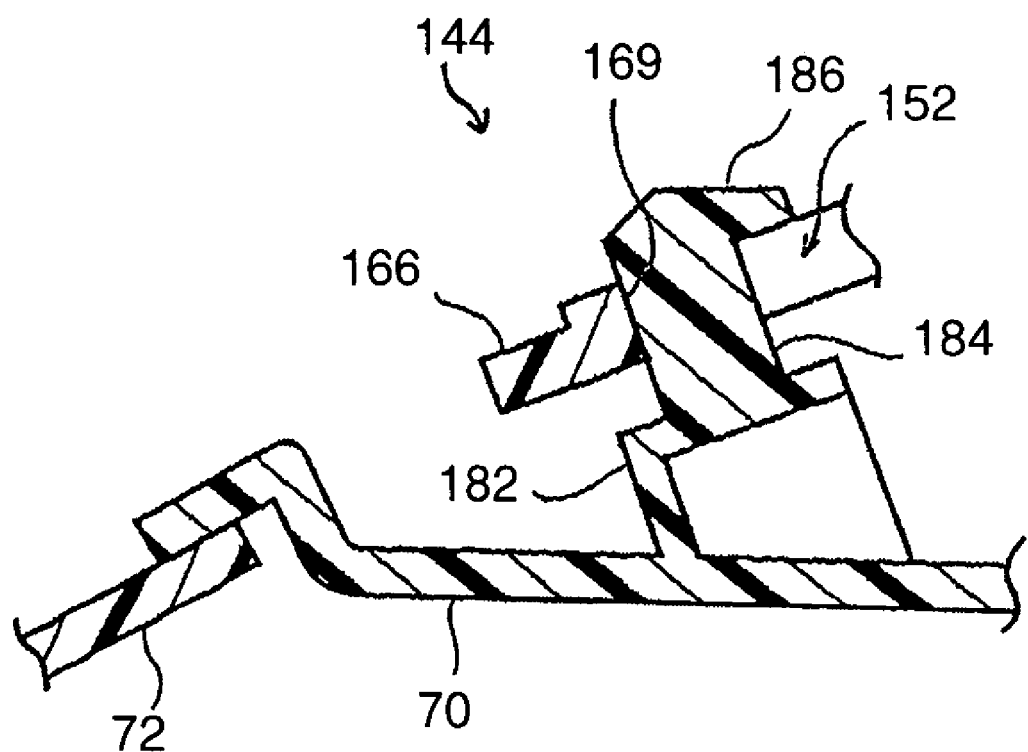
FIG. 16 illustrates a cross-sectional view taken along the line 16-16 of FIG. 13.
Figure 17:
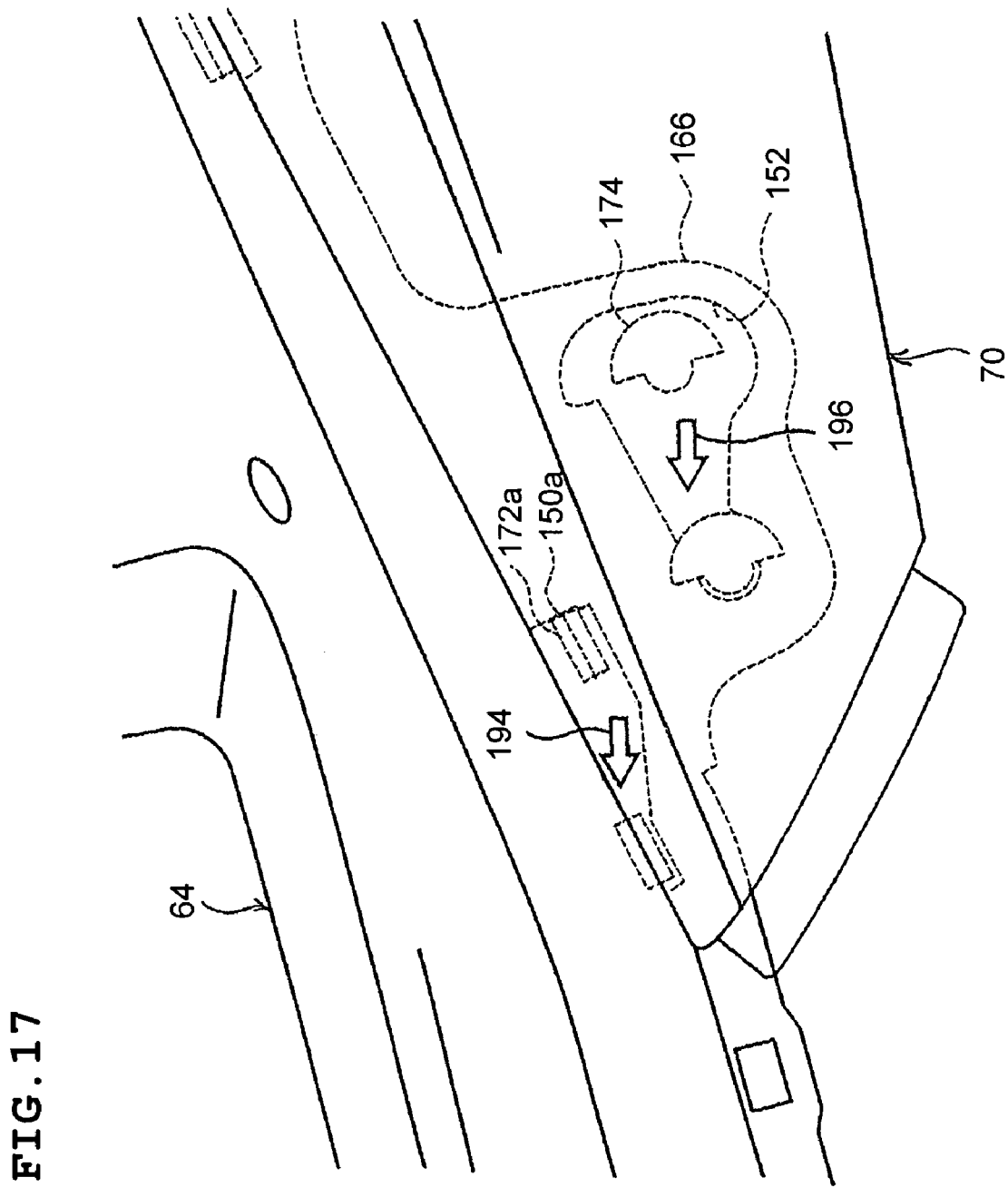
FIG. 17 illustrates a side elevation view of the center and side covers to specifically show the projections moving within the slots in the coupling structure for the center and side covers.

Afterwards, the engage portion 178 of each small projection 172*a*, 172*b*, 172*c* engages a periphery of the associated forward end portion 158 of each small slot 150*a*, 150*b*, 150*c* as best shown in FIG. 14. Because the forward end portion 158 of the small slot 150*a*, 150*b*, 150*c* is narrowed, the small projection 172*a*, 172*b*, 172*c* are securely maintained in the small slot 150*a*, 150*b*, 150*c* so as not to slip out. Also, the stem portion 184 of the large projection 174 engages a periphery of the forward end portion 169 of the large slot 152 as best shown in FIG. 16. Because the forward end portion 169 of the large slot 152 is narrowed and the cap portion 186 of the large projection 174 is larger than the forward end portion 169, the large projection 174 is securely maintained in the large slot 152 so as not to slip out. It should be noted that the projections 172*a*, 172*b*, 172*c*, 174 are not necessarily disposed at the terminal ends of the forward end portions 158, 169 of the associated slots 150*a*, 150*b*, 150*c*, 152.

The illustrated first and second type coupling structures 142, 144 include the slots 150*a*, 150*b*, 150*c*, 152. Thus, the side covers 70 are easily attached to the center cover 64. Because unreasonable stress does not exist in the first and second type coupling structures 142, 144, none of the engagement pieces such as, for example, the engage portions 178, are broken.

In the illustrated first and second type coupling structures 142, 144, the small slots 150*a*, 150*b* and the large slot 152 (or the small projections 172*a*, 172*b* and the large projection 174) are arranged to form the triangle with each other. Because of the arrangement, even if the side covers 70 receive a force that would rotate the small projections 172*a*, 172*b*, 172*c* about an axis of each small projection 172*a*, 172*b*, 172*c*, the second type coupling structures 144, particularly the stem portion 184, also receive the force and prevents the small projections 172*a*, 172*b*, 172*c* from being twisted or broken. In addition, the stem portion 184 of the large projection 174 is substantially thicker than the engage portion 178 of each small projection 172*a*, 172*b*, 172*c*, the large projection 174 so as to effectively oppose the foregoing force.

The illustrated cap portion 186 is convenient for casting each side cover 70 because only the rear half of the cap portion 186 is larger than the stem portion 184. That is, the configuration of the cap portion 186 enables a decrease in the number of molds and facilitates the separation of the side cover 70 from the molds. In addition, the large projection 174 is disposed at a location adjacent to the forward end of the side cover 70. Thus, the side cover 70 provides one of the molds for forming the step between the rear half of the cap portion 186 with a sufficient space to move.

Openings having any suitable shape may replace the slots 150*a*, 150*b*, 150*c*, 152 as long as the projections 172*a*, 172*b*, 172*c*, 174 can engage the openings. On the other hand, projections having any suitable shape may replace the projections 172*a*, 172*b*, 172*c*, 174 as long as the replaced projections can engage the slots or the openings.

The longitudinal axes 156 of the small slots 150*a*, 150*b*, 150*c* may not necessarily align. However, all the longitudinal axes 156 preferably extend substantially parallel to each other.

Also, two of the small slots 150*a*, 150*b*, 150*c* and two of the small projections 172*a*, 172*b*, 172*c* corresponding to the slots are sufficient to make the triangle. In the illustrated preferred embodiment, the small slots 150*a*, 150*b* and the small projections 172*a*, 172*b* are used to make the triangle. The extra small slot 150*c* and the extra small projection 172*c* are provided because the side cover 70 is long enough to require the extra slot 150*c* and projection 172*c* to securely attach the side cover 70. If longer side covers are used, four or more small slots and small projections may be provided. In addition, one or more second type coupling structures may be added to the illustrated second type coupling structures 144.

With reference to FIG. 11, each side cover 70 may be directly attached to the associated seat rail 46 by a bolt. Specifically, each side cover 70 preferably includes a bracket 200 at a rear portion thereof. The illustrated bracket 200 extends substantially horizontally toward the longitudinal center plane LCP. The bracket 200 is preferably integrally formed with the body of the side cover 70. On the other hand, each seat rail 46 preferably includes another bracket corresponding to the bracket 200. Because the rear portion of the side cover 70 is spaced apart from the reference position 94, and the side cover 70 or the seat rail 46 may have the dimensional variations due to tolerances, at least one of the brackets includes a slot. In the illustrated preferred embodiment, the bracket 200 includes a slot 202, while the bracket of the seat rail 46 includes a bolt hole that preferably has a substantially round shape. The bolt is inserted into the slot 202 and the bolt hole of the bracket of the seat rail 46. The side cover 70 is thus attached to the seat rail 46 even if the side cover 70 or the seat rail 46 has the dimensional variations due to tolerances.

With reference to FIG. 10, each side cover 70 includes a bracket 204 to which each lower cover 72 is attached by a bolt. The illustrated bracket 204 extends substantially vertically from a front portion of the side cover 70. The bracket 204 preferably includes a bolt hole 206 that has a substantially round shape. The bracket 204 preferably integrally formed with the body of the side cover 70. The lower cover 72, on the other hand, has another bracket corresponding to the bracket 204. Because the position where the bracket 204 is spaced apart from the reference position 94, and the bracket 204 includes the substantially round bolt hole 206, the bracket of the lower cover 72 includes a slot. The bolt is inserted into the bolt hole 206 and the slot of the bracket of the lower cover 72. The lower cover 72 is thus attached to the side cover 70 even if the side cover 70 or the lower cover 72 has the dimensional variations due to tolerances.

The covers 64, 66, 70, 72 may be directly or indirectly attached to other portions of the frame 32. For example, the leg shield 66 is further directly attached to the third vertical frame section 42. Also, each lower cover 72 is further attached to the leg shield 68 and the foot board 76 by bolts without being directly affixed to the frame 32. Because the lower covers 72 are often detached for the maintenance services of the components inside of the lower covers 72, the lower covers 72 are preferably attached to the leg shield 68, the side covers 70 and the foot boards 76 after those covers 68, 70 and the foot boards 76 are attached.

The front cover 68, the bottom cover 74 and the foot board 76 may be directly or indirectly attached to other portions of the frame 32. For example, the front cover 68 is attached to the leg shield 66 by bolts.

Because those portions are spaced apart from the reference position 94, the locations are determined with less precision than the reference position. Coupling structures for those locations thus include slots similar to the slots described above or holes having a diameter larger than a diameter of bolts inserted into the holes. Preferably, the farther the locations of the slots or the holes are spaced from the reference position 94, the larger the slots or the holes. This is because the larger slots or holes can absorb larger dimensional variations of the covers or the frame that can accumulate at the farther locations.

In the illustrated preferred embodiment, every angle of the triangle is preferably an acute angle. The triangle having the acute angles is advantageous because the small projections 172*a*, 172*b*, 172*c* less likely to break when a force is applied thereto than with a triangle that has an obtuse angle.

Although this invention has been disclosed in the context of certain preferred embodiments, it will be understood by those skilled in the art that the present invention extends beyond the specifically disclosed preferred embodiments to other alternative embodiments and/or uses of the invention and obvious modifications and equivalents thereof.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

What is claimed is:

1. A vehicle comprising:

wheels;

a frame arranged to support the wheels; and first and second covers arranged to cover at least one of the wheels and the frame; wherein the first cover includes first, second and third openings, the first, second and third openings being arranged to define a triangle;

the second cover includes first, second and third projections arranged at locations corresponding to the first, second and third openings of the first cover, respectively;

the first, second and third projections are inserted into the respective first, second and third openings to couple the second cover with the first cover; and the third opening is larger than the first and second openings, and the corresponding third projection is thicker than the first and second projections.

2. The vehicle as set forth in claim 1, wherein each of the first, second and third openings is a slot having a longitudinal axis, the respective longitudinal axes of the first, second and third opening extend substantially parallel to each other.

3. The vehicle as set forth in claim 2, wherein the longitudinal axes of the first and second openings extend along substantially the same line.

4. The vehicle as set forth in claim 1, wherein the third projection includes a stem portion that engages a periphery of the third opening.

5. The vehicle as set forth in claim 4, wherein the third projection includes a cap portion disposed on the stem portion to prevent the third projection from slipping out of the third opening of the first cover.

6. The vehicle as set forth in claim 4, wherein at least one of the first and second projections has a hook shape that passes through the corresponding one of the first and second openings and engages a surface of the first cover.

7. The vehicle as set forth in claim 1, wherein at least one of the first and second projections has a hook shape that passes through the corresponding one of the first and second openings and engages a surface of the first cover.

8. The vehicle as set forth in claim 1, wherein each of the first, second and third openings is a slot having a longitudinal axis, each of the first, second and third openings includes first and second ends that are spaced apart from each other along the longitudinal axis, the second end of each of the first, second and third openings is narrower than the first end thereof, the corresponding one of the first, second and third projections is disposed at the second end when the second cover is coupled with the first cover.

9. The vehicle as set forth in claim 1, wherein each angle of the triangle is an acute angle.

10. The vehicle as set forth in claim 1, wherein
the first, second, and third openings include first, second and third slots;
the first and second slots are arranged along a substantially straight line;
the third slot is spaced from the substantially straight line; and
the first, second and third projections are inserted into the respective first, second and third slots to couple the first cover and the second cover with each other.

11. The vehicle as set forth in claim 10, wherein each of the first, second and third slots has a longitudinal axis, the respective longitudinal axes of the first, second and third slots extend substantially parallel to each other.

12. The vehicle as set forth in claim 11, wherein the longitudinal axis of each of the first and second slots extend along the substantially straight line.

13. The vehicle as set forth in claim 10, wherein the third slot is larger than the first and second slots, and the respective third projection is thicker than the first and second projections.

14. The vehicle as set forth in claim 10, wherein at least one of the first and second projections has a hook shape that passes through the corresponding one of the first and second slots and engages a surface of the first cover.

15. The vehicle as set forth in claim 13, wherein the third projection includes a stem portion that engages a periphery of the third slot.

16. The vehicle as set forth in claim 15, wherein the third projection includes a cap portion disposed on the stem portion to prevent the third projection from slipping out of the third slot of the first cover.

17. The vehicle as set forth in claim 10, wherein each angle of the triangle is an acute angle.

* * * * *